United States Patent
Hekimian

[11] 3,921,053
[45] Nov. 18, 1975

[54] DC-TO-DC CONVERTER
[75] Inventor: Norris C. Hekimian, Rockville, Md.
[73] Assignee: Hekimian Laboratories, Inc., Rockville, Md.
[22] Filed: Aug. 14, 1974
[21] Appl. No.: 497,460

[52] U.S. Cl. ................................................. 321/2
[51] Int. Cl.² ...................................... H02M 3/335
[58] Field of Search ........ 321/2, 15, 45 R; 307/255; 331/113 R

[56] References Cited
UNITED STATES PATENTS

| | | | |
|---|---|---|---|
| 3,222,547 | 12/1965 | Boan et al. | 321/45 R |
| 3,566,145 | 2/1971 | Goodale | 307/255 X |
| 3,568,095 | 3/1971 | Cordalis | 307/255 X |
| 3,610,953 | 10/1971 | Gordon et al. | 307/255 X |
| 3,654,490 | 4/1972 | Kan | 307/255 |
| 3,792,337 | 2/1974 | Gilmore | 321/2 |

OTHER PUBLICATIONS
"D–C to D–C Converter Offers Positive or Negative Bias," Gerald Olson, *Electronics*, May 25, 1970, p. 95.
"Transformerless Voltage Doubler Has Good Output Regulation," K. N. Pal, *Electronic Design* 26, Dec. 21, 1972, p. 64.

Primary Examiner—William M. Shoop
Attorney, Agent, or Firm—Rose & Edell

[57] ABSTRACT

An efficient and inexpensive DC-to-DC converter is disclosed which produces no current surges on the primary DC power line. A pair of emitter-coupled, complementary transistors have their collector-emitter circuits connected in series between the DC power line and ground and have their bases driven by a common control signal from an oscillator circuit. Circuitry is provided to cause each transistor to saturate without requiring a saturable core switching transformer. The converter is employed as a power supply operable from either AC or DC primary power. Common circuitry is employed in both the AC and DC modes to minimize expense and space requirements.

10 Claims, 1 Drawing Figure

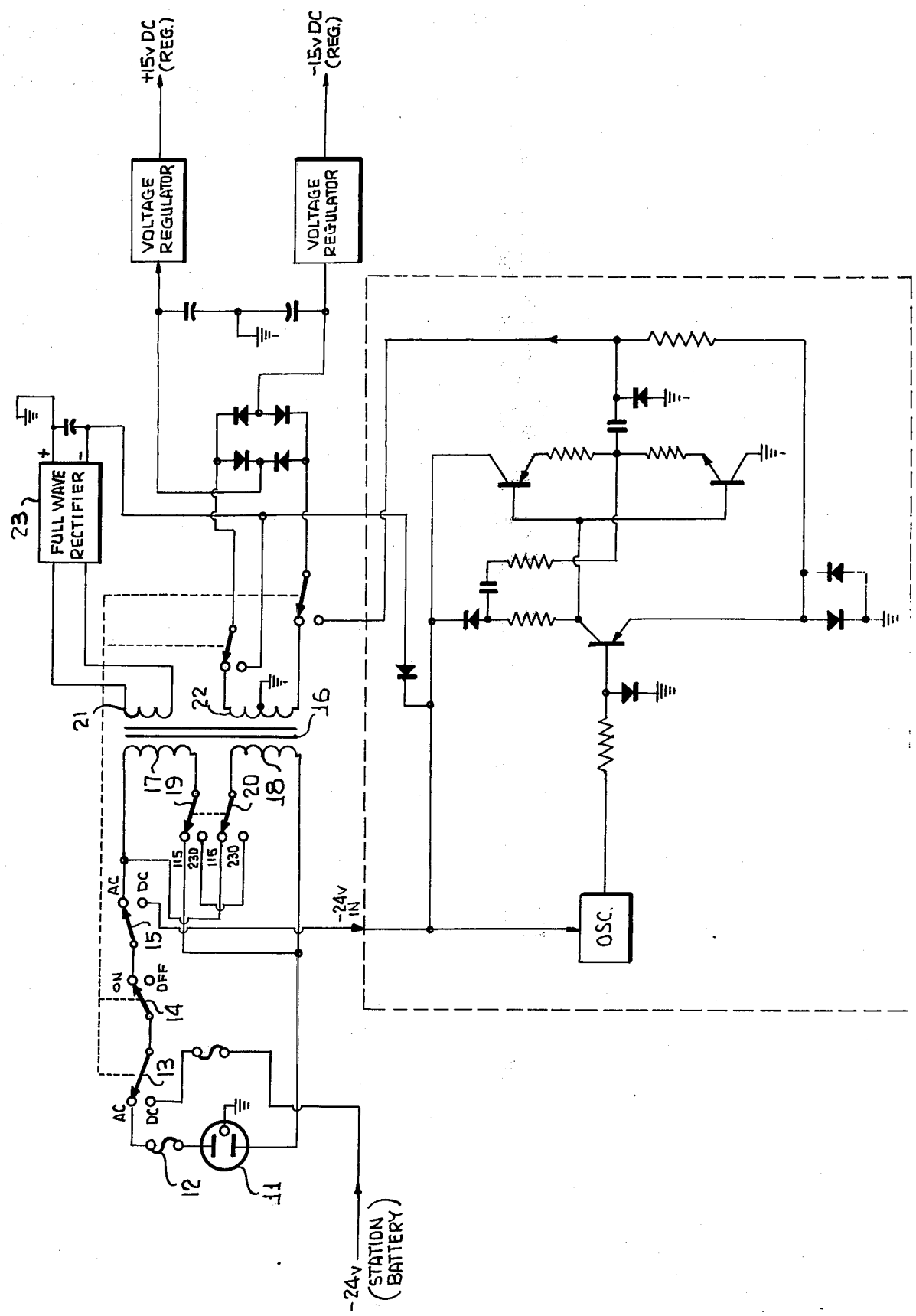

DC-TO-DC CONVERTER

BACKGROUND OF THE INVENTION

The present invention relates to DC power supplies and, more particularly, to improvements in DC-to-DC converter circuits.

Many transistorized circuits require regulated bipolar DC supply voltages. Power supplies for such circuits preferably utilize commercially available AC voltage as a primary power source. However, where AC primary power is not available, such as in remote telephone installations, a unipolar battery must serve as the primary power source. In the case of the aforementioned telephone installations, the battery would be the station battery, typically supplying −24 volts DC ± 10%. Equipment used at the remote station, however, might require positive and negative regulated supply voltages of 15 volts or more. Since the station battery is grounded, and since its 24 volts output is not large enough to provide the 30 volt difference between the two bipolar supply levels, a DC-to-DC converter must be employed.

DC-to-DC converters are well known in the prior art. Many in present use employ a transistorized oscillator, powered by the primary DC source, to provide a gating signal which alternately renders each of a pair of transistor switches conductive. The transistor switches pass current of reversing polarities from the primary DC source to a voltage multiplier circuit which provides the necessary output levels. Most transistorized switching circuits employed in DC-to-DC converter circuits utilize switching transformers of the saturable core type. These transformers introduce large transient current surges on the primary power line, a problem which is particularly objectionable where the primary power is derived from the station battery in telephone equipment. Moreover, the transformers create magnetic fields which tend to produce undesirable effects on surrounding circuitry. Where transformers are not so employed in the prior art, saturation of the transistor switches is not readily achieved and there is a considerable loss, in the form of a voltage drop, introduced by each transistor. This loss reduces the efficiency of the level conversion, limiting the attainable voltage levels to levels lower than would be attained with a more efficient conversion.

It is therefore a primary object of the present invention to provide an efficient DC-to-DC converter which produces negligible transient current surges on the primary power line and which does not create magnetic fields.

It is also an object of the present invention to provide an efficient DC-to-DC converter which employs inexpensive standard components and does not create current surges on the primary power line.

In many types of test equipment, for example telephone test equipment which is used at remote telephone stations and elsewhere, it is desirable that the equipment power supply be capable of operating on both AC and DC primary power. Generally, the AC-driven circuitry includes a rectifier and filter which feeds a voltage regulator circuit. The DC-driven circuitry employs a DC-to-DC converter, including a voltage multiplier circuit, which likewise feeds the regulator circuit. In the prior art, the rectifier and filter in the AC circuit have been separate and apart from the voltage multiplier in the DC-to-DC converter. It is therefore another object of the present invention to minimize cost and size of a DC power supply by utilizing components of the AC-driven rectifier and filter in the voltage multiplier circuit for the DC-to-DC converter.

SUMMARY OF THE INVENTION

In accordance with the present invention, a DC-to-DC converter employs an oscillator which alternately switches a control transistor in and out of its conducting state. The control transistor, in turn, drives the bases of a pair of emitter-coupled complementary transistors connected with their collector-emitter circuits in series between the primary DC supply voltage and ground. An output capacitor, connected from the common emitters to a grounded-diode output clamp, provides an output signal which alternates between ground and a voltage of similar magnitude but opposite polarity to the primary supply voltage. The commonly-driven complementary transistors can never conduct current simultaneously; therefore, the current drain on the primary supply is steady and without undesirable surges.

The complementary transistor having its collector tied to the primary supply voltage is assured operation in the saturation region by placing a bias capacitor and diode in series between its emitter and collector so that the bias capacitor charges when the transistor is non-conductive and discharges through a resistor and the emitter-base circuit when the transistor conducts. Saturation of the second complementary transistor is effected by a feedback path from the converter output voltage to the emitter of the control transistor and a diode which clamps that emitter to ground. The small voltage drop across the diode clamp is reflected through the control transistor and applied to the base of the second transistor whereby the base voltage becomes sufficiently different from the grounded collector of the second transistor to cause heavy conduction.

A power supply with which the converter is used includes a rectifier and filter assembly which, when driven by AC primary power, provides a bipolar DC output voltage. A mode switch alternatively connects AC or the DC-to-DC converter output square wave to the rectifier. The rectifier and filter operate to smooth the output square wave and provide the necessary DC level.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawing, wherein:

The single FIGURE is a schematic diagram of the DC-to-DC converter of the present invention, employed in a DC power supply.

DESCRIPTION OF THE PREFERRED EMBODIMENT

Referring to the drawing in greater detail, a DC power supply provides regulated + 15 volts DC and −15 volts DC when operated with either AC or DC primary power. The AC primary power may be either 115 volts or 230 volts; the DC primary power is −24 volts DC as would be provided by a station battery in telephone equipment. The particular voltage levels described for the primary power and output voltage are mentioned by way of example only; the scope of the invention is in no way limited by these exemplary numbers.

Four ganged two-position switches 13, 15, 25 and 26 determine whether the power supply is operated from AC or DC primary power. Considering AC operation first, AC current at 115 volts or 230 volts is received at plug 11 and passed through AC fuse 12 to the AC contact of switch 13. If the main power switch 14 is ON, the AC voltage is applied through the AC contact of switch 15 to primary windings 17, 18 of step down transformer 16. Primary windings 17 and 18 are interconnected by ganged two-position switches 19, 20 so that the windings may be alternatively connected in series or parallel across the AC plug 11. More specifically, if the AC primary power is at 115 volts, switches 19, 20 are placed in their 115 position wherein primary windings 17 and 18 are connected in parallel. If the AC power is at 230 volts, switches 19 and 20 are placed in their 230 position wherein windings 17 and 18 are connected in series.

Transformer 16 has two secondary windings 21 and 22. Winding 21 drives full wave rectifier 23 and capacitor 24 in a conventional manner to provide an unregulated negative output voltage, typically −24 volts DC, for use independently of the regulated bipolar 15 volt DC levels. Winding 22 is employed in the derivation of the regulated levels with which this invention is primarily concerned.

The center tap of secondary winding 22 is grounded and its ends are connected to the AC contacts of respective switches 25, 26. Continuing with the assumption of operation in the AC primary power mode, switches 25 and 26 in their AC positions connect secondary winding 22 across a full wave rectifier comprising 4 diodes 31, 32, 33 and 34. Specifically, diodes 31 and 32 are connected cathode-to-cathode across winding 22 while diodes 33 and 34 are connected anode-to-anode across the winding. A capacitor 35 is connected between ground and the cathodes of diodes 31 and 32; capacitor 36 is connected between ground and the anodes of diodes 33 and 34. Capacitor 35 charges to approximately the positive peak of the stepped-down AC voltage and provides a smoothed positive voltage which is regulated by voltage regulator 37. Capacitor 36 charges to approximately the negative peak of the stepped-down AC voltage and provides a smoothed negative voltage which is regulated by voltage regulator 38. Operation of the power supply in the AC primary power mode is conventional and well known.

Operation in the DC primary power mode proceeds with switches 13, 15, 25 and 26 in their DC positions. The −24 volts DC from the station battery is applied to DC-to-DC converter 40 through DC fuse 41 and switches 13, 14 and 15. With switch 15 in its DC position, the primary windings of transformer 16 are bypassed, leaving the transformer secondary windings unenergized.

The −24 volts DC level passed by switch 15 activates the oscillator 42 in DC-to-DC converter 40. The oscillatory output signal from oscillator 42 is coupled through series-connected capacitor 43 and resistor 44 to the base of PNP transistor 45. A diode 46 has its anode connected to the base of transistor 45 and its cathode connected to ground. A resistor 47 and diode 48 are connected in series between the collector of transistor 45 and the −24 volts input line, the cathode of diode 48 being connected to the −24 volts line. A pair of inverse parallel-connected diodes 49 and 50 are connected between ground and the emitter of transistor 45.

The collector of transistor 45 is directly coupled to the bases of PNP transistor 51 and NPN transistor 52. The collector of transistor 51 is directly connected to the −24 volts input line; the collector of transistor 52 is directly coupled to ground. A pair of resistors 53, 54 are connected in series between the emitters of transistors 51 and 52. A capacitor 55 and resistor 56 are connected in series between the junction of resistor 53, 54 and the junction of resistor 47 and diode 48. The junction of resistor 53, 54 is also connected to one side of a capacitor 57, the other side of which is connected to: (1) the DC contact of switch 26; (2) the cathode of diode 58 which has its anode connected to ground; and (3) one side of a resistor 59, the other side of which is connected in feedback relation to the emitter of transistor 45.

In addition to the foregoing components, DC-to-DC converter 40 includes a diode 60 having its cathode connected to the −24 volts input line. The anode of diode 60 is connected to the DC contact of switch 25 and to the ungrounded side of capacitor 24. Diode 60 provides the negative portion of the unregulated bipolar output voltage during the DC primary power operating mode.

Operation with DC primary power proceeds in the following manner. Oscillator 42 provides a continuous alternating gating signal which renders transistor 45 conductive during the negative portion of the gating signal. Capacitor 43 serves as a DC blocking capacitor and diode 46 prevents capacitor 43 from remaining charged after a single gating cycle and thereafter maintaining transistor 45 non-conductive.

When transistor 45 is not conducting its collector is at a relatively negative level and thereby drives transistor 51 into conduction and prevents transistor 52 from conducting. When transistor 45 is conducting, its collector voltage is determined by the small positive voltage drop across diode 49 which will be described in greater detail subsequently. The relatively positive level at the collector of transistor 45 maintains transistor 51 non-conducting and transistor 52 conducting. Transistor 45 thereby serves as a control transistor which alternately drives each of complementary transistors 51 and 52 into conduction. Assuming small values of resistance for resistors 53 and 54, when transistor 51 conducts, current flows between ground and the −24 volts DC input line via diode 58, capacitor 57, resistor 53 and the collector-emitter circuit of transistor 51. Capacitor 57 charges by virtue of this current until a voltage on the order of −24 volts is stored therein. In this condition the left side of the capacitor (as viewed in the drawing) is at −24 volts whereas the right side is substantially at ground. When transistor 52 becomes conductive and transistor 51 non-conductive, the ground at the collector of transistor 52 is reflected at the left side of capacitor 57. Since the voltage across the capacitor cannot change instantaneously, the stored 24 volts remain across the capacitor so that the right side of the capacitor is boosted substantially instantaneously to +24 volts relative to the grounded left side of the capacitor. When transistor 51 conducts once again, the right side of capacitor 57 once again goes to approximately ground (less the drop across diode 58) whereas the left side goes negative. In this manner the voltage at the right side of the capacitor (i.e. at the cathode of diode 58) alternates between ground and approximately +24 volts. The resulting positive square wave is applied to the full wave rectifier 31–34 through switch 26. When the square wave is positive, current flows through diode 32 to charge capacitor 35; when the square wave is at ground it has negligible effect at the full wave rectifier and filters. The −24 V OUT signal from diode 60, however, continuously supplies current to flow through switch 25 and diode 33 to charge capacitor 36. Thus, in the DC primary power mode, the −24 V OUT signal charges capacitor 36 to provide the −15 V DC (REG) level, whereas the square wave supplied through capacitor 57 charges capacitor 35 to provide the +15 V DC (REG) level.

It should be noted that the DC primary power mode utilizes the full wave rectifier components which are part of the AC primary power mode operation. That is, the positive-going alternating wave established at capacitor 57 would have to be rectified and smoothed before it could be regulated. This rectification and smoothing is done by already existing diode 32 and capacitor 35, rather than by additional components used solely for DC primary power operation.

Efficient operation of the DC-to-DC converter is assured by operating transistors 51 and 52 in saturation when they are conducting, thereby minimizing the voltage drop across these transistors. Saturation, as is well known in the art, refers to that portion of the transistor operating characteristic wherein the emitter-base and collector-base circuits are forward-biased. Saturation of transistor 51 is assured by capacitor 55, resistor 47 and diode 48. More particularly, when control transistor 45 is cut-off, in order to render transistor 51 conductive it must drive the base of transistor 51 negative with respect to its emitter and collector. In the absence of resistor 47, capacitor 55 and diode 48, the maximum negative voltage which can be applied to the base of transistor 51 is the −24 volts on the input line; however, the collector of transistor 51 is tied to this same line. Elements 47, 48 and 55 are therefore required to assure that a strongly negative signal is available at the base of transistor 51 to drive it into saturation. In operation, when transistor 51 is not conducting, current flows through transistor 52, resistors 54 and 56 and diode 48 to charge capacitor 55. Both transistors 45 and 52 are conducting at this time, keeping the base of transistor 51 positive relative to its emitter so that transistor 51 remains off. When oscillator 42 renders control transistor 45 non-conductive, charged capacitor 55 is placed in series with resistors 56 and 47 between the base and emitter of transistor 51. The charge on capacitor 55 is such as to drive the base of transistor 51 highly negative relative to the emitter, whereby transistor 51 is driven heavily into saturation.

It should be noted that the boost bias circuit does not require resistor 56 to drive transistor 51 into saturation. However, if resistor 56 is zero, capacitor 55 charges to the peak value of voltage appearing at the junction between resistors 53, 54, or about 24 volts. This is an unnecessary waste of power since a lower voltage would readily suffice to effect saturation; in addition, the high level charging of capacitor 55 produces current surges on the primary voltage line. Therefore, resistor 56 is employed and causes the charge across the capacitor to go to approximately the average emitter voltage, or about 12 volts. This two to one reduction in voltage brings about a four-to-one saving in power.

Saturation of transistor 52 is brought about by feeding back the output voltage via resistor 59 to the emitter of control transistor 45. Specifically when control transistor 45 and transistor 52 are conductive, the alternating output voltage is at its high or positive level. This positive level is applied through relatively high resistance 59 and across diode 49 to the emitter of transistor 45. The small forward voltage drop across diode 49 (on the order of 0.6 volts) is reflected at the collector of transistor 45 and the base of transistor 52. The voltage at the base of transistor 52 is thereby rendered sufficiently positive relative to the emitter of that transistor to drive the transistor just into the saturation region.

The function of diode 50 is to permit control transistor to conduct in the first instance by providing a current path which prevents the emitter from following the converter output voltage. In addition, diodes 49 and 50 actually square the output voltage by assuring that control transistor 45 switches sharply even in response to the relatively slow rising edges of the output signal from oscillator 42.

DC-to-DC converter 40, as described, introduces no significant current surges on the −24 volts input line. This is because there is no substantial current drain when transistor 52 conducts; when transistor 51 conducts the current supplied by the source is only about twice the load current. This contrasts with current surges drawn by saturable core transformers, which surges are many times the load current. Further, since the transistors are complementary and are driven by the same signal, there is no opportunity for the conduction intervals of each to overlap.

In a typical embodiment, which is not to be construed as limiting on the present invention, the following component values were employed and the converter operated satisfactorily:

| Component | Value |
|---|---|
| capacitor 43 | .47 µf |
| resistor 44 | 1.1 K ohms |
| resistor 47 | 510 ohms |
| resistors 53, 54 | 0.47 ohms |
| capacitor 55 | 50 µf |
| resistor 56 | 430 ohms |
| capacitor 57 | 330 µf |
| resistor 59 | 220 ohms |
| diode 46 | IN3064 |
| diodes 46, 48–50, 58 | IN4002 |
| transistors 45, 51 | 2N5193 |
| transistor 52 | 2N5190 |

It is to be understood that component and parameter values may be changed within the scope of the invention, particularly where different input and/or output voltages are specified. Moreover, transistor conductivity types and diode polarity connections may be varied as necessary to accommodate positive rather than negative polarity for the primary voltage. Further, transistors 45, 51, 52 may be field effect transistors or other type three-electrode electronic swithes, as long as elements 51 and 52 are of opposite-type conductivity.

While I have described and illustrated one specific embodiment of my invention, it will be clear that variations of the details of construction which are specifically illustrated and described may be resorted to without departing from the true spirit and scope of the invention as defined in the appended claims.

I claim:

1. A DC-to-DC converter responsive to a primary DC voltage of a first polarity for providing an output voltage at the opposite polarity, said converter comprising:
first and second complementary transistors, each having a base, an emitter and a collector;
control means for providing a gating signal alternating between two amplitude levels;
means connecting said gating signal to the base of each of said first and second transistors;
means connecting said primary DC voltage to the collector of said first transistor;
means connecting the collector of said second transistor to circuit ground;
first and second resistors of relatively low resistance connected together at a first circuit junction;
means connecting said first and second resistors in series between the emitters of said first and second transistors;
a second circuit junction;
a first capacitor connected between said first and second circuit junctions;
a first diode connected between said second circuit junction and ground and poled to conduct current when the voltage at said second circuit junction is of said first polarity;
a second diode connected to said second circuit junction and poled to conduct current when the voltage at said second circuit junction is at said opposite polarity;
a second capacitor connected between said second diode and circuit ground to be charged by current conducted through said second diode;
circuit means for biasing said first and second transistor such that each transistor, when conducting, is in the region of saturation;
wherein said circuit means includes:
a third diode;
a third capacitor;
a third resistor;
means connecting said third diode and third capacitor in series between said primary DC voltage and said first circuit junction, said third diode being poled to conduct current flowing between said primary DC voltage and ground through said third capacitor and the collector-emitter circuit of said second transistor;
means connecting said third resistor between the base of said first transistor and a circuit junction between said third diode and third capacitor to permit discharge of said third capacitor through said third resistor and the base-emitter circuit of said first transistor when said first transistor is in the conducting state.

2. The converter according to claim 1 further comprising a current-limiting resistor connected in series with said third capacitor and said third diode to limit the charge current through said third capacitor.

3. The converter according to claim 2 wherein said control means comprises:
an oscillator operative in response to said primary DC voltage to continuously provide an oscillatory signal;
a control transistor of the same conductivity type as said first transistor and having a base, a collector, and an emitter; and
means connecting said oscillatory signal to the base of said control transistor;
wherein said means connecting said gating signal comprises a connection between the collector of said control transistor and the bases of said first and second transistors; and
wherein said circuit means additionally comprises: a feedback resistor connected between said second circuit junction and the emitter of said control transistor; and a pair of inverse parallel-connected diodes connected between the emitter of said control transistor and circuit ground.

4. The converter according to claim 3 wherein said second diode is part of a full wave rectifier which is selectively switchable to be driven by a primary AC voltage, and wherein said second capacitor is connected to be charged to said opposite polarity during both each half cycle of said primary AC voltage.

5. The converter according to claim 4 further comprising a voltage regulator for regulating the voltage stored in said second capacitor.

6. The converter according to claim 4 further comprising:
a fourth diode;
a fourth capacitor;
a fifth diode connected as part of said full wave rectifier;
means connecting said fourth and fifth diodes and said fourth capacitor in series between said primary DC voltage and circuit ground to permit said fourth capacitor to be charged by said primary DC voltage through said fourth and fifth diodes; and
regulator means for regulating voltage stored in said fourth capacitor.

7. A DC-to-DC converter responsive to a primary DC voltage of a first polarity for providing an output voltage at the opposite polarity, said converter comprising:
first and second complementary transistors, each having a base, an emitter and a collector;
control means for providing a gating signal alternating between two amplitude levels;
means connecting said gating signal to the base of each of said first and second transistors;
means connecting said primary DC voltage to the collector of said first transistor;
means connecting the collector of said second transistor to circuit ground;
first and second resistors of relatively low resistance connected together at a first circuit junction;
means connecting said first and second resistors in series between the emitters of said first and second transistors;
a second circuit junction;
a first capacitor connected between said first and second circuit junctions;
a first diode connected between said second circuit junction and ground and poled to conduct current when the voltage at said second circuit junction is of said first polarity;
a second diode connected to said second circuit junction and poled to conduct current when the voltage at said second circuit junction is at said opposite polarity;
a second capacitor connected between said second diode and circuit ground to be charged by current conducted through said second diode; and
circuit means for biasing said first and second transistor such that each transistor, when conducting, is in the region of saturation;
wherein said control means comprises:

an oscillator operative in response to said primary DC voltage to continuously provide an oscillatory signal;

a control transistor of the same conductivity type as said first transistor and having a base, a collector, and an emitter; and means connecting said oscillatory signal to the base of said control transistor;

wherein said means connecting said gating signal comprises a connection between the collector of said control transistor and the bases of said first and second transistors; and wherein said circuit means comprises:
a feedback resistor connected between said second circuit junction and the emitter of said control transistor; and a pair of inverse parallel-connected diodes connected between the emitter of said control transistor and circuit ground.

8. The converter according to claim 1 wherein said second diode is part of a full wave rectifier which is selectively switchable to be driven by a primary AC voltage, and wherein said second capacitor is connected to be charged to said opposite polarity during both each half cycle of said primary AC voltage.

9. The converter according to claim 1 further comprising:
a fourth diode;
a fourth capacitor;
a fifth diode connected as part of said full wave rectifier;
means connecting said fourth and fifth diodes and said fourth capacitor in series between said primary DC voltage and circuit ground to permit said fourth capacitor to be charged by said primary DC voltage through said fourth and fifth diodes; and
regulator means for regulating voltage stored in said fourth capacitor.

10. A DC-to-DC converter responsive to a primary DC voltage of a first polarity for providing an output voltage at the opposite polarity, said converter comprising:

first and second electronic switches of opposite conductivity type, each having first and second signal-conducting terminals and a gating terminal;
control means for providing a gating signal alternating between two amplitude levels;
means connecting said gating signal to the gating terminal of each of said first and second switches;
means connecting said primary DC voltage to the second terminal of said first switch;
means connecting the second terminal of said second switch to circuit ground;
means interconnecting the first terminals of said first and second switches to define a first circuit junction;
a second circuit junction;
a first capacitor connected between said first and second circuit junctions;
a first diode connected between said second circuit junction and ground and poled to conduct current when the voltage at said second circuit junction is of said first polarity;
a second diode connected to said second circuit junction and poled to conduct current when the voltage at said second circuit junction is at said opposite polarity;
a second capacitor connected between said second diode and circuit ground to be charged by current conducted through said second diode;
a third diode;
a third capacitor;
a resistor;
means connecting said third diode and third capacitor in series between said primary DC voltage and said first circuit junction, said third diode being poled to conduct current flowing between said primary DC voltage and ground through said third capacitor and the first and second signal-conducting terminals of said second electronic switch; and
means connecting said resistor between the gating terminal of said first electronic switch and a circuit junction between said third diode and third capacitor to permit discharge of said third capacitor through said resistor when said first electronic switch is in the conducting state.

* * * * *